(12) United States Patent
Butler et al.

(10) Patent No.: US 10,321,232 B2
(45) Date of Patent: Jun. 11, 2019

(54) DISTRIBUTED AMPLIFICATION FOR ADAPTIVE AUDIO RENDERING SYSTEMS

(71) Applicant: Dolby Laboratories Licensing Corporation, San Francisco, CA (US)

(72) Inventors: Joel A. Butler, Ozark, MO (US); Garth Norman Showalter, Ozark, MO (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/562,089

(22) PCT Filed: Mar. 30, 2016

(86) PCT No.: PCT/US2016/024834
§ 371 (c)(1),
(2) Date: Sep. 27, 2017

(87) PCT Pub. No.: WO2016/160876
PCT Pub. Date: Oct. 6, 2016

(65) Prior Publication Data
US 2018/0077491 A1 Mar. 15, 2018

Related U.S. Application Data

(60) Provisional application No. 62/142,384, filed on Apr. 2, 2015.

(51) Int. Cl.
*H04B 3/54* (2006.01)
*H04R 3/12* (2006.01)
(Continued)

(52) U.S. Cl.
CPC .............. *H04R 3/12* (2013.01); *G10L 19/008* (2013.01); *H04B 3/542* (2013.01); *H04R 27/00* (2013.01);
(Continued)

(58) Field of Classification Search
CPC ..... G10L 19/008; G10L 19/167; H04S 3/008; H04B 3/54; H04B 3/542
(Continued)

(56) References Cited

U.S. PATENT DOCUMENTS 4,935,861 A * 6/1990 Johnson, Jr. ............ H02J 9/062
307/46
7,206,648 B2 4/2007 Fujishita
(Continued)

FOREIGN PATENT DOCUMENTS

EP 2389011 11/2011
JP 2004-328678 11/2004
(Continued)

*Primary Examiner* — Alexander Jamal

(57) ABSTRACT

Embodiments are described for a hybrid amplification architecture that separates individual audio amplifier stages from the power supply and a simple two- or three-conductor bus that transmits both power and audio signal to a plurality of daisy-chained speakers to playback adaptive audio content in an expanded surround-sound environment including surround and overhead speakers or for use within professional live sound applications and/or distributed audio systems. A control unit generates digital audio and power and transmits both simultaneously over the bus to individual speaker units associated with each speaker. The speaker units recover the power decode the channel assignment to route the audio to the appropriate speakers.

15 Claims, 5 Drawing Sheets

(51) Int. Cl.
*H04R 27/00* (2006.01)
*G10L 19/008* (2013.01)

(52) U.S. Cl.
CPC .. *H04B 2203/545* (2013.01); *H04R 2227/003* (2013.01)

(58) Field of Classification Search
USPC .............................. 381/80, 22, 120; 375/257
See application file for complete search history.

(56) References Cited

U.S. PATENT DOCUMENTS

| | | | |
|---|---|---|---|
| 8,265,294 B2 | 9/2012 | Tjalsma | |
| 8,385,561 B2 | 2/2013 | Merrey | |
| 8,588,428 B2 | 11/2013 | Croft, III | |
| 9,014,390 B2 | 4/2015 | Butler | |
| 2007/0103949 A1* | 5/2007 | Tsuruya | H02M 1/4225 363/125 |
| 2008/0056507 A1 | 3/2008 | Logvinov | |
| 2010/0119078 A1 | 5/2010 | Curtis | |
| 2012/0121105 A1 | 5/2012 | Holladay | |
| 2013/0094662 A1 | 4/2013 | Nathan | |
| 2014/0101351 A1 | 4/2014 | Hooper | |
| 2014/0180684 A1* | 6/2014 | Strub | G10L 19/008 704/211 |
| 2014/0247892 A1* | 9/2014 | Williams | H04B 3/54 375/257 |

FOREIGN PATENT DOCUMENTS

| | | |
|---|---|---|
| JP | 2005-079768 | 3/2005 |
| JP | 2008-177887 | 7/2008 |
| JP | 2008-197558 | 8/2008 |
| JP | 2009-071632 | 4/2009 |
| JP | 2013-542653 | 11/2013 |
| JP | 2015-015618 | 1/2015 |
| WO | 2002/005261 | 1/2002 |
| WO | 2014/110289 | 7/2014 |

* cited by examiner

DISTRIBUTED AMPLIFICATION FOR ADAPTIVE AUDIO RENDERING SYSTEMS

CROSS-REFERENCE TO RELATED APPLICATIONS

This application claims priority from U.S. Provisional Patent Application No. 62/142,384 filed 2 Apr. 2015, which is hereby incorporated by reference in its entirety.

TECHNICAL FIELD

One or more implementations relate generally to audio signal processing, and more specifically to a distributed amplification and loudspeaker system for playback of multi-channel audio.

BACKGROUND

The introduction of digital cinema and the development of true three-dimensional ("3D") or virtual 3D content has created new standards for sound, such as the incorporation of multiple channels of audio to allow for greater creativity for content creators and a more enveloping and realistic auditory experience for audiences. Expanding beyond traditional speaker feeds and channel-based audio as a means for distributing spatial audio is of critical importance, and there has been considerable interest in a model-based audio description that allows the listener to select a desired playback configuration with the audio rendered specifically for their chosen configuration. The spatial presentation of sound utilizes audio objects, which are audio signals with associated parametric source descriptions of apparent source position (e.g., 3D coordinates), apparent source width, and other parameters. Further advancements include a next generation spatial audio (also referred to as "adaptive audio") format that has been developed which comprises a mix of audio objects and traditional channel-based speaker feeds, along with positional metadata for the audio objects. In a spatial audio decoder, the channels are sent directly to their associated speakers or down-mixed to an existing speaker set, and audio objects are rendered by the decoder in a flexible (adaptive) manner. The parametric source description associated with each object, such as a positional trajectory in 3D space, is taken as an input along with the number and positions of speakers connected to the decoder. The renderer then utilizes certain algorithms, such as a panning law, to distribute the audio associated with each object ("object-based audio") across the attached set of speakers. The authored spatial intent of each object is thus optimally presented over the specific speaker configuration that is present in the listening room.

With the introduction of adaptive audio systems, the number of required amplifier channels has greatly increased (e.g., up to 32 or more channels), thereby necessitating the installation of new amplifiers and/or higher channel-count amplifiers. Additionally, because each surround loudspeaker requires its own amplification channel, upgrading the sound systems in existing theaters requires extensive modifications (e.g., eliminating parallel combinations of speakers in favor of point-to-point individual wiring). FIG. 1 is a diagram that illustrates a typical amplification approach for multi-channel applications using existing technology. As shown in FIG. 1, a system having nine channels 102, with nine individual speakers or sets of speakers 108 requires nine individual amplifiers 104, nine individual cable runs 106, and five or more power supplies (inside the two-channel amplifiers). Such a system represents a typical amplifier-speaker layout as can be found in a modern movie theater playing surround-sound audio, and illustrates the amount of hardware and infrastructure currently used in such systems. Changing the amplification and wiring infrastructure to accommodate greater than the current supported topography within theaters is a costly endeavor and replacing existing audio amplifiers and cabling that are perfectly operational is not an efficient method of upgrading to accommodate newer audio formats. In many instances, audio amplifiers used in medium to large-scale surround sound environments are quality devices with capable output power, but simply do not have enough channels to support sophisticated multi-channel systems, such as the Dolby Atmos system.

What is needed, therefore, is an intelligent audio interface system that provides flexible, cost-effective power distribution, while also adding features found in advanced audio playback applications. What is further needed is a system that provides an effective upgrade path for home and professional listening environments to play advanced audio content with minimal installation and retrofit cost.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves also may be inventions. Dolby, Dolby Digital Plus, and Atmos are trademarks of Dolby Laboratories Licensing Corporation.

BRIEF SUMMARY OF EMBODIMENTS

Embodiments are directed to a system having a power source outputting power, a first digital data transceiver outputting multi-channel digital data to the power source and also to an output of the power source, a unitary transmission bus coupling the output of the power source to a plurality of speakers and transmitting the power and multi-channel digital data to the plurality of speakers and an additional digital data transceiver associated with each speaker of a plurality of speakers and configured to recover the power to drive the associated speaker and transmit an appropriate channel of the multi-channel digital data to the associated speaker. Input to the first digital transceiver may comprise multi-channel digital audio, and the first digital transceiver is configured to synchronize and condition the power and the multi-channel digital audio to ensure optimal timing, amplitude, and phase characteristics of data transmitted over the unitary transmission bus. The unitary transmission bus comprises a single multi-conductor cable having two or three conductors, and wherein a third conductor comprises an earth ground in the case where the multi-conductor cable comprises three conductors. Each additional digital data transceiver, which may be associated with individual speakers (i.e., located near or within the loudspeakers) comprises a power recovery circuit comprising a low impedance speaker driver coupled to a capacitive storage element and a dedicated digital data transceiver configured to operate in transmit or receive modes and configured to decode a channel assignment provided in the multi-channel digital data and modulate the appropriate multi-channel digital data to the associated speaker based on the decoded channel assignment, such that different source content can be played back through each speaker of the plurality of speakers. The power may be encoded within a power signal audio band of between 0 (DC) to 20 kHz, and the digital audio data may be encoded within a digital audio transmission band of between 1 MHz to 100 Mhz, though embodiments are not so limited. Power may also be transmitted in a power transmission band as high as a few or several hundreds of kHz (e.g., 0 (DC) to 500 kHz) in applications where a non-standard audio amplifier is used. The power source and each additional digital data transceiver may be coupled over the unitary transmission bus using a standardized power-line communication interface, comprising at least one of IEEE 1901 or G.hn protocol, or other similar protocols. The multi-channel digital data may be transmitted using an Internet Protocol (IP) transmission, and wherein the first digital data transceiver comprises an IP interface receiving IP-based streaming audio data, and wherein the IP-based streaming audio data comprises at least in part adaptive audio content having channel-based audio and object-based audio. In an embodiment, at least some of the plurality of speakers comprises a surround-sound audio system playing back audio signals assigned to discrete channels according to a surround-sound format, and the at least some of the plurality of speakers comprises a multi-driver speaker, and the additional digital data transceiver associated therewith comprises a bi-amplification circuit that transmits a first portion of the appropriate channel to a first driver and a second portion to a second driver of the multi-driver speaker.

Embodiments are further directed to a method of encoding multi-channel digital data to be transmitted within a first transmission band and power to be transmitted within a second transmission band, transmitting the digital data and power over a single transmission bus to a plurality of speakers, and at each speaker of the plurality of speakers, recovering the power to drive the speaker and decode the data to playback a specific channel of the multi-channel digital data through the speaker so that different source content is played back through each speaker of the plurality of speakers. The multi-channel digital content comprises digital audio content and the method further comprises synchronizing and conditioning the power and the digital audio to ensure optimum timing, amplitude, and phase characteristics of data transmitted over the single transmission bus. The first transmission band may comprise a power signal audio band of between 0 (DC) to 20 kHz or higher (e.g., several hundred kHz), and the second transmission band may comprise a digital audio transmission band of between 10 MHz to 100 Mhz. The method may further comprise transmitting the digital audio over the single transmission bus using an Internet Protocol (IP) communication system and transmitting the power over the single transmission bus using a standardized power-line communication interface, comprising at least one of IEEE 1901 or G.hn protocol or similar protocols. The digital audio may comprise at least in part adaptive audio content having channel-based audio and object-based audio, and wherein at least some of the plurality of speakers may comprise a surround-sound audio system playing back audio assigned to discrete channels according to a surround-sound format. The method further comprises receiving analog audio data and converting the analog audio data to the digital audio content though an analog-to-digital component. The single transmission bus may comprise a multi-conductor cable having two or three conductors, and wherein a third conductor may comprise an earth ground in the case where the multi-conductor cable comprises three conductors.

Embodiments are yet further directed to an apparatus comprising: a power source outputting power encoded within a first transmission band of a transmission spectrum; and a first digital data transceiver outputting multi-channel digital data encoded within a second transmission band of the transmission spectrum to an input of the power source and an output of the power source, the output of the power source configured to be coupled to a unitary transmission bus providing the power and multi-channel digital data to a plurality of speakers, wherein each speaker is associated with a respective digital data receiver configured to recover the power to drive the associated speaker and transmit an appropriate channel of the multi-channel digital data to the associated speaker. Input to the first digital transceiver comprises multi-channel digital audio, and the first digital transceiver is configured to synchronize and condition the power and the multi-channel digital audio to ensure optimal timing, amplitude, and phase characteristics of data transmitted over the unitary transmission bus. The digital audio may comprise at least in part, adaptive audio content having channel-based audio and object-based audio, and wherein at least some of the plurality of speakers comprises a surround-sound audio system playing back audio assigned to discrete channels according to a surround-sound format.

Embodiments are further directed to an apparatus comprising a component providing association to a respective speaker; a power recovery circuit configured to receive power encoded in a first frequency band and transmitted over a unitary transmission bus that transmits both audio and data over the same conductors, and comprising a low impedance speaker driver coupled to a capacitive storage element; and a dedicated digital data transceiver switchable between transmit and receive modes and configured to receive multi-channel digital data and decode a channel assignment provided in the multi-channel digital data and modulate the appropriate multi-channel digital data to the respective speaker based on the decoded channel assignment, such that different source content can be played back through each speaker of a speaker array, including the respective speaker. The component comprises at least one close coupling connection, a built-in circuit, and/or a short transmission link. The apparatus may further comprise an interface to a power source outputting the power and a first digital data transceiver outputting the over the unitary transmission bus. The multi-channel digital data may comprise digital audio comprising at least in part adaptive audio content having channel-based audio and object-based audio, and wherein at least some of the speakers of the speaker array comprise a surround-sound audio system playing back audio assigned to discrete channels according to a surround-sound format.

Embodiments are yet further directed to a transmission bus comprising: an interface to a transceiver providing power and digital audio data; a pair of conductors within a unitary sheath, wherein the conductors simultaneously transmit the power and digital audio data to a plurality of loudspeakers, wherein the digital audio data comprises adaptive audio content having audio components to be individually played back on different loudspeakers; and a plurality of taps, each tap providing a separate link to each loudspeaker of the plurality of loudspeakers joined together by the pair of conductors. The power may be encoded within a first frequency band and the digital audio data is encoded within a second frequency band, and each loudspeaker of the plurality of loudspeakers is associated with a speaker unit that recovers the power and decodes the audio to drive the associated speaker with an appropriate audio signal.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

Systems and methods are described for a hybrid amplification architecture that separates individual audio amplifier stages from the power supply and a simple two- or three-conductor bus that transmits both power and audio signals to a plurality of daisy-chained speakers to playback adaptive audio content in an expanded surround-sound environment including surround and overhead speakers.

Aspects of the one or more embodiments described herein may be implemented in an audio or audio-visual system that processes source audio information in a mixing, rendering and playback system that includes one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
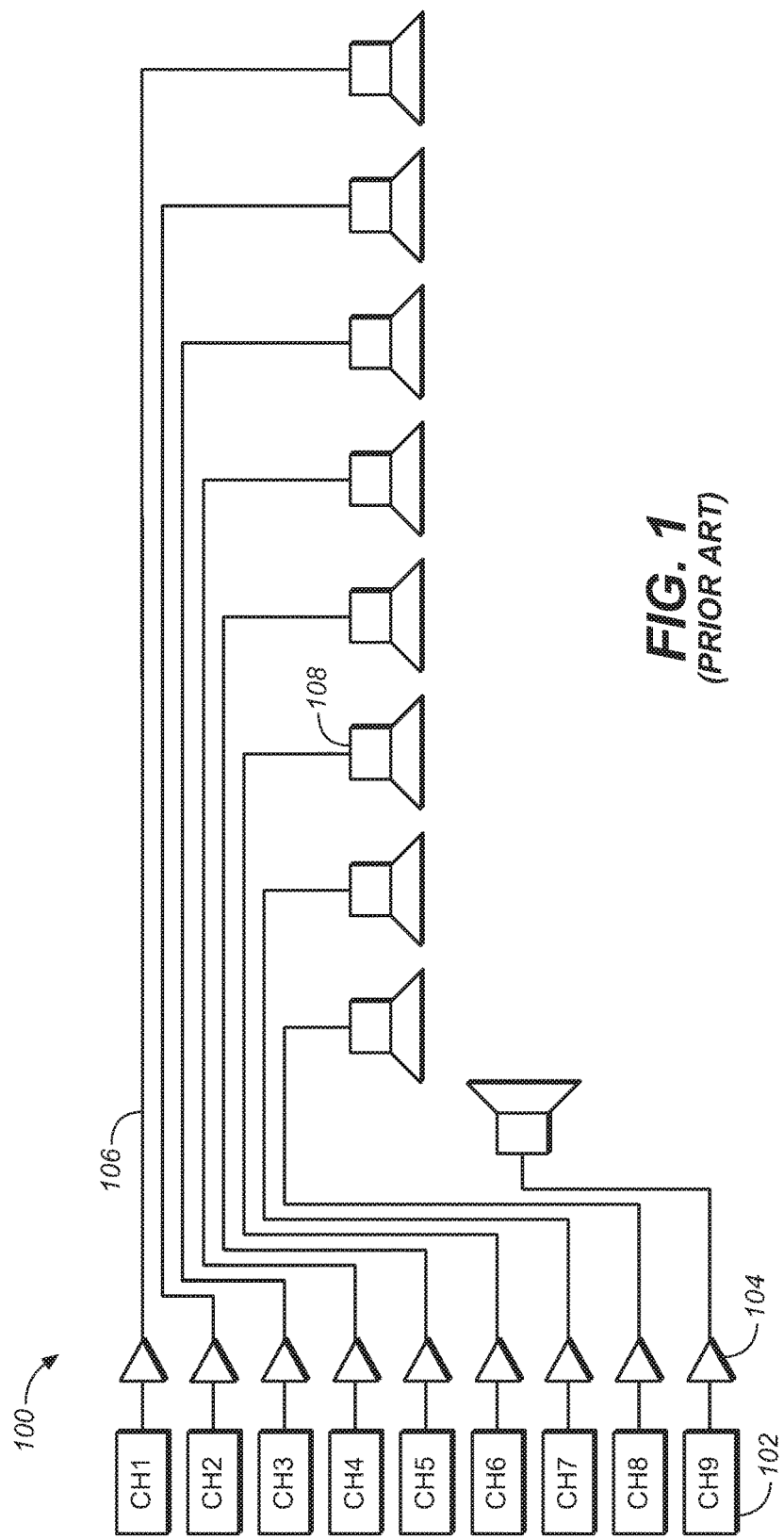
FIG. 1 is a diagram that illustrates a typical amplification approach for multi-channel applications using existing technology.
Figure 2:
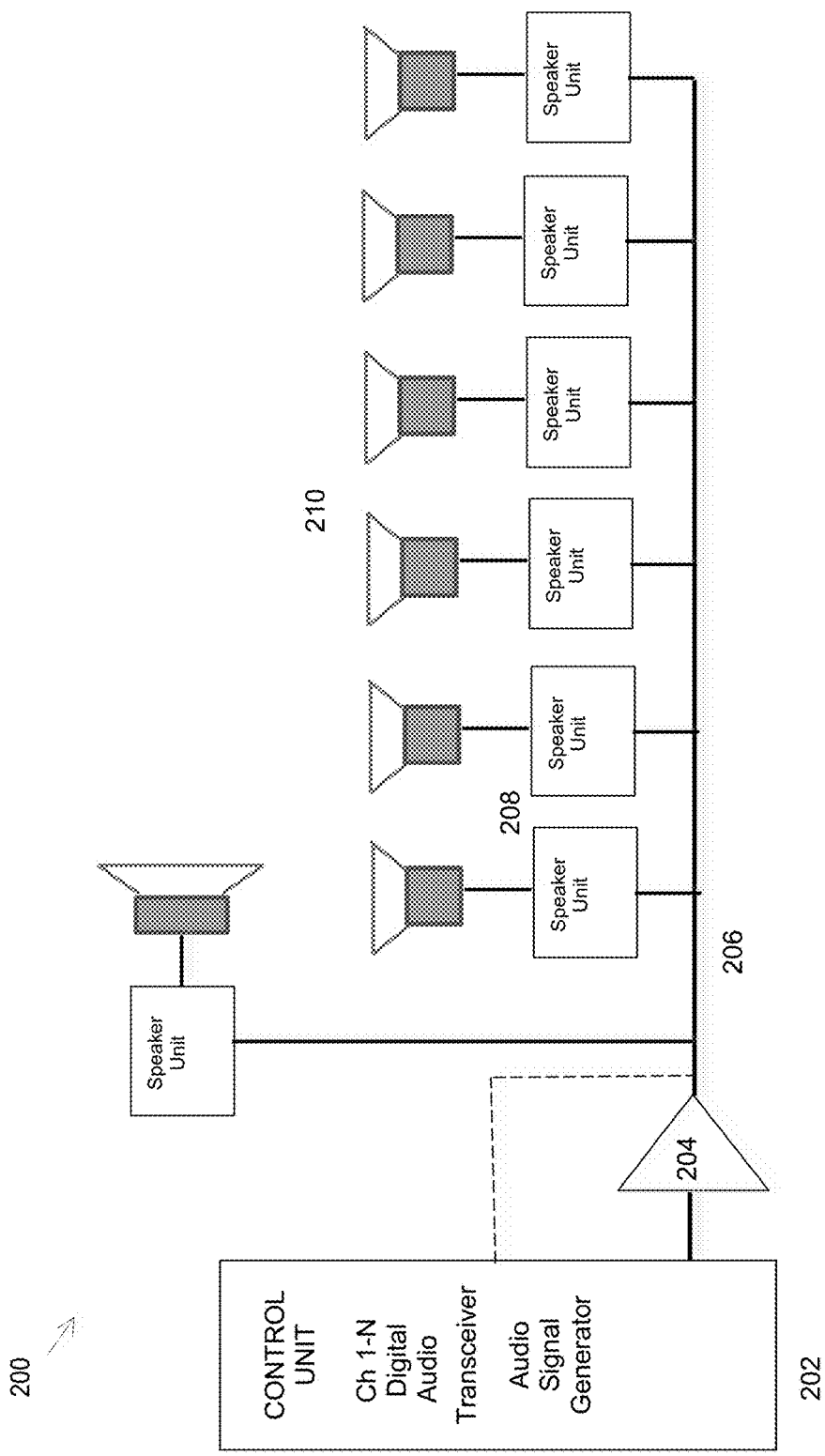
FIG. 2 illustrates a distributed amplification system, under some embodiments.

FIG. 2 illustrates a distributed amplification system under some embodiments. System 200 of FIG. 2 is a multi-channel speaker system with any number, N, of speakers 210. Instead of having one amplifier and nominally one power supply (or one-half of a power supply) and separate dedicated cabling per speaker channel, system 200 features one main amplifier 202, one cable run ("bus") 206, and one power supply 204 for all of the N speaker channels 210. To attain this simplification in the power and signal distribution infrastructure, each speaker channel has associated with it a dedicated speaker unit 208 that receives and recovers the power and audio signal that is generated by the control unit 202. The number N channels can be any practical number of channels dictated by the system requirements. For a standard surround sound setup, N may be 7 or 9, while for a full Atmos type system with height speakers, N can be on the order of 16 or 24 channels or more. In addition to surround sound formats, embodiments may also be configured for use within professional live sound applications and/or distributed audio systems.

FIG. 2 illustrates a distributed amplification system under some embodiments. System 200 of FIG. 2 is a multi-channel speaker system with any number, N, of speakers 208. Instead of having one amplifier and nominally one power supply (or one-half of a power supply) and separate dedicated cabling per speaker channel, system 200 features one main amplifier 202, one cable run ("bus") 206, and one power supply 204 for all of the N speaker channels 210. To attain this simplification in the power and signal distribution infrastructure, each speaker channel has associated with it a dedicated speaker unit 208 that receives and recovers the power and audio signal that is generated by the control unit 202. The number N channels can be any practical number of channels dictated by the system requirements. For a standard surround sound setup, N may be 7 or 9, while for a full Atmos type system with height speakers, N can be on the order of 16 or 24 channels or more. In addition to surround sound formats, embodiments may also be configured for use within professional live sound applications and/or distributed audio systems.

The architecture of system 200 allows for audio power and signal to be distributed to multiple loudspeakers without the use of high channel-count amplifiers and multiple point-to-point cables, thus reducing the number of audio power amplifier channels and the number of independent loudspeaker cables, while still allowing each loudspeaker to have independent drive (i.e., separate audio signals present at each loudspeaker). Amplifier 204 is a power supply that may be implemented as an optimized or standard audio amplifier to transmit a power signal over the bus 206. Control unit 202 comprises an N-channel digital audio transceiver and an audio signal generator that adds a digital audio signal onto the same bus cable. The digital audio transceiver 202 transmits multiple digital audio streams in the presence of the power signal generated by the audio amplifier 204. These two signal streams (power and data) are transmitted simultaneously through bus 206, are received by small electronic speaker units 208 built in (or closely coupled) to each loudspeaker 210. The speaker units recover the power, receive the digital audio stream, and drive the loudspeakers with the selected signals. In one embodiment, the bus cable 206 is a single standard two-conductor speaker cable of standard gauge (e.g., 10-20 gauge) and can be used to send multiple channels of digital audio and appropriate power to independent loudspeakers connected to the same two-conductor cable. That is, many speakers can be wired in a daisy-chained or parallel fashion while still allowing independent channels of audio to be played at each speaker (i.e., different signals and volumes). The bus cable may be implemented as a simple two-conductor speaker cable or a three-conductor cable, such as an AC power cable where one conductor is an earth ground, or any other similar simple conductor cable. Alternatively to traditional speaker cable (i.e., stranded wire cable), a solid-core Romex (typical AC wiring cable) cable might be used.

Power source 204 may be implemented as a standard power amplifier. Alternatively, it may be implemented as a highly-optimized base-band AC or DC power source, similar to an audio amplifier but with much higher power efficiency and power throughput. For this embodiment, the system would be highly optimized for maximum power transmission, minimized power loss, and lowest cost.

The loudspeakers 210 may represent a single driver or transducer within a single enclosure (cabinet), or a multi-driver loudspeaker with different transducers handling different audio components (e.g., woofer, midrange, tweeter), or arrays of speakers. In an embodiment, the speaker units 208 can also include additional circuitry to drive each speaker component independently (e.g., woofer, tweeter, etc.) in a bi-amplification system. Both the control unit and each speaker unit includes a transceiver stage allowing for bidirectional data flow between the digital audio transceiver of the control unit and the multiple speakers residing on the bus. Thus, other pieces of information can be propagated to-and-from the loudspeaker. For example, a loudspeaker could report telemetry (e.g., down-angle, temperature, etc.), and/or setup information could be sent to individual speakers (e.g., volume control, LED lighting effect controls, angle adjustment for motorized pan-tilt, and so on). In systems utilizing bi-amplification within the speaker, derivation of two (or more) audio signals can be done by sending the speaker unit 208 a single audio stream, wherein the speaker unit employs signal processing to derive two (or more) audio signals from a single input stream. Alternatively, the control unit 202 may send the multiple streams directly to the individual amplification stages within the speaker unit 208. Alternate embodiments of this implementation are shown and described with reference to FIG. 5 below.

Figure 3:
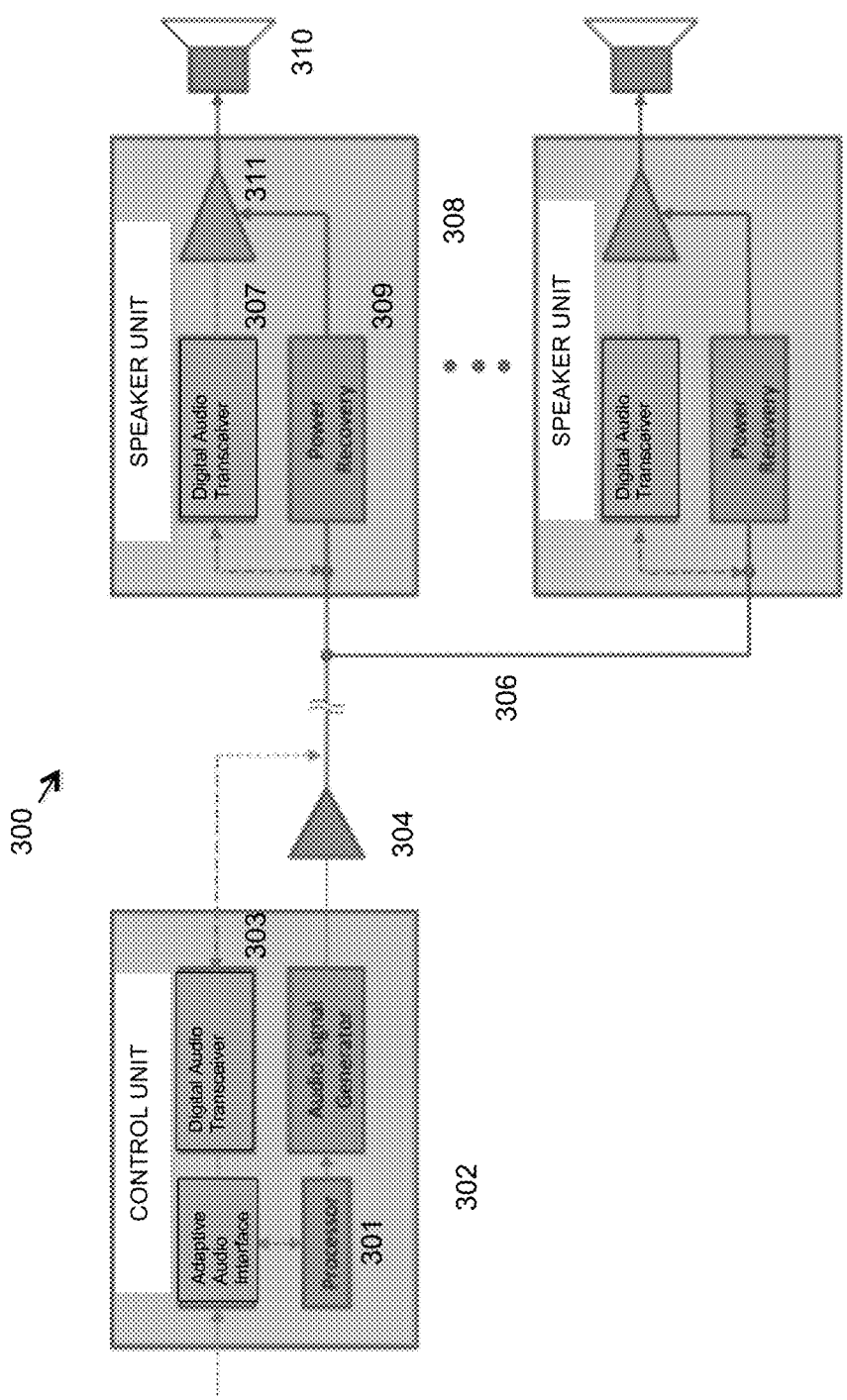
FIG. 3 illustrates components of control and speaker units for the distributed amplification system of FIG. 2 under some embodiments.

FIG. 3 illustrates components of control and speaker units for the distributed amplification system of FIG. 2 under some embodiments. In an embodiment, power source 304 comprises a standard audio amplifier to provide power for other distributed audio output stages. This helps achieve an efficiency goal of component reuse by eliminating one of the largest cost drivers in any audio amplifier design—the power supply. An audio power amplifier is typically designed as an AC-DC power supply, feeding into one or more low-impedance, transistorized, output stages. Most audio amplifiers are designed as two- to four-channel devices, wherein there is a singular power supply (AC/DC offline supply) fanning out to power the output stages. The architecture of the system 300 subdivides the audio amplification process such that the power supply is physically separated from the individual output stages and is chosen such that it effectively supplies an AC stimulus to power multiple output stages. The power supply can thus be implemented as a standard audio amplifier that develops a controlled, audio-band, AC waveform, and provide regulatory compliance (e.g., NRTL, CE, FCC, safety isolation, etc.).

For the embodiment of FIG. 3, the control unit 302 generates digital audio signals that comprises adaptive audio having both channel-based and object-based audio components. An adaptive audio interface and processor 301 provide a signal to an audio signal generator that stimulates the power source 304. A digital audio transmitter 303 of the control unit 302 outputs the digital audio signal directly to the output of the power source so that both power and the digital audio signal are carried on the bus cable 306. The control unit also includes appropriate circuitry that conditions the power and data to ensure that they are properly transmitted over the bus in terms of timing, amplitude, and phase. Although embodiments are illustrated with respect to adaptive audio applications, it should be noted that any appropriate audio format may be used, and that, depending on the type of interface provided in control unit 302, the input audio may be straight digital audio, hybrid audio, pure channel-based audio, pure object-based audio, and so on. In the case where analog audio is provided, the system may include an integrated or separate analog-digital converter to provide the required digital audio signal to stimulate the power supply 304 and provide digital audio input to the bus cable 306. In an embodiment, the control unit 302 outputs digital data primarily to be coupled into the output of the power source, and input to the power source is stimulated with an analog audio-band modulation signal (i.e., sine wave, pink-noise, summed audio signal, etc.). Thus, digital data is primarily routed/coupled to the output of the power source, whereas the input to the power source can be controlled via digital or analog techniques.

For the embodiment of FIG. 3, the control unit 302 generates digital audio signals that comprises adaptive audio having both channel-based and object-based audio components. An adaptive audio interface and processor provide signal to an audio signal generator that stimulates the power source 304. A digital audio transmitter 303 of the control unit 302 outputs the digital audio signal directly to the output of the power source so that both power and the digital audio signal are carried on the bus cable 306. The control unit also includes appropriate circuitry that conditions the power and data to endure that they are properly transmitted over the bus in terms of timing, amplitude, and phase. Although embodiments are illustrated with respect to adaptive audio applications, it should be noted that any appropriate audio format may be used, and that, depending on the type of interface provided in control unit 302, the input audio may be straight digital audio, hybrid audio, pure channel-based audio, pure object-based audio, and so on. In the case where analog audio is provided, the system may include an integrated or separate analog-digital converter to provide the required digital audio signal to stimulate the power supply 304 and provide digital audio input to the bus cable 306. In an embodiment, the control unit 302 outputs digital data primarily to be coupled into the output of the power source, and input to the power source is stimulated with an analog audio-band modulation signal (i.e., sine wave, pink-noise, summed audio signal, etc.). Thus, digital data is primarily routed/coupled to the output of the power source, whereas the input to the power source can be controlled via digital or analog techniques.

In an embodiment in which the power source 304 comprises a standard or other type of amplifier, the system 300 can be configured to create power stimulus signals into the amplifier as well as having a line connected to the output of the amplifier to inject the digital data stream onto the speaker wire or bus cable 306. The digital data stream wire can also be used as a sense line for the controller through an A/D (analog/digital) circuit. The controller 302 can then compare the input and output signals coming from the respective amplifier channel. This allows additional features to be implemented in the software (or equivalent circuitry) such as gain modification adjustment (e.g., if the user changes the amplifier gain, the system can adjust the input signal to compensate), fault monitoring for distortion, fault monitoring for signal present, automated system configuration to optimize gain structure, and other similar functions. For the fault monitoring applications, if a fault is found, the system can be configured to log the fault, send a fault notification over a connected network (e.g., Internet), and/or send an audible or visual alert, such as by sounding an alarm tone or flashing the amplifier signal light on the faulty amplifier channel(s) by sending pulses of the power signal to the corresponding channel.

In an embodiment, the bus cable 306 that links the control unit 302 to each of the speaker units 308 is a single two-conductor speaker cable (or three-conductor power cable or similar). Data is transmitted over the bus using Internet Protocol (IP) conventions, though other protocols are also possible. A standard power-line communication format is utilized to provide sufficient bandwidth and channel separation to allow the channelized audio information produced by the control unit to be delivered to the output stages. Examples of standard power-line communication protocol include IEEE 1901 (HomePlug AV 1.1) and the G.hn protocol. It should be noted that embodiments are not so limited, and other standardized protocols, or proprietary techniques for transmitting digital audio information over power source cabling to deliver independent audio streams to distributed output stages are also possible.

Figure 4:
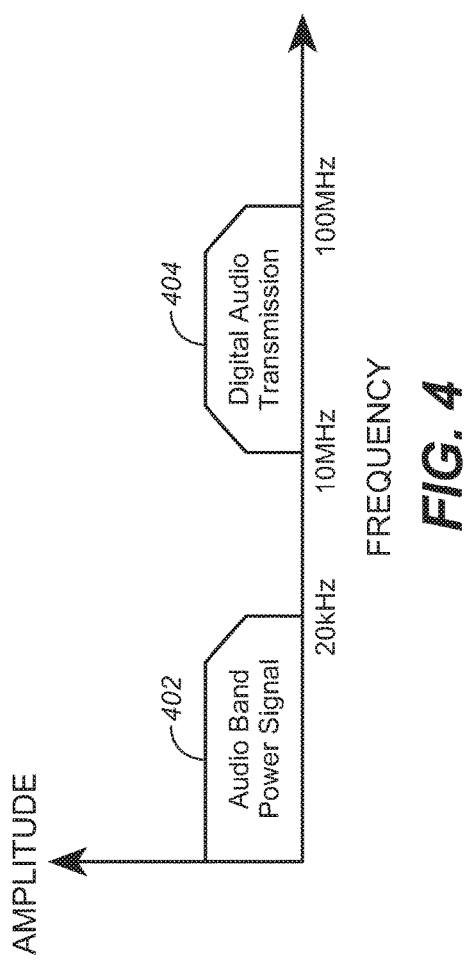
FIG. 4 illustrates the separation of power and audio signals by frequency band, under an embodiment.

The power signal and digital audio signal are transmitted over the same conductors and are encoded in different bands of the frequency spectrum. FIG. 4 illustrates the separation of power and audio signals by frequency band, under an embodiment. As shown in FIG. 4, the power component 402 is relegated to a relatively low frequency band of between 0 (DC) and 20 kHz, while the digital data component 404 is carried in a band stretching between 1 MHz to 100 MHz, as an example, though embodiments are not so limited. It should be noted that power may also be transmitted in a power transmission band as high as a few or several hundreds of kHz (e.g., 0 (DC) to 500 kHz) in applications where a non-standard audio amplifier is used. Similarly, although FIG. 4 the transmission band frequencies may span other frequency ranges, such as 1-100 MHz. In some cases, the data transmission could be done at frequencies higher than 100 MHz, depending on the capabilities of components such as the PLCs (programmable logic chips) that are used.

With reference to FIG. 3 in relation to FIG. 4, the first digital data transceiver 303 generates the second transmission band 404 and couples this into the output of the power source. Whereas the input to the power source typically is comprised of baseband audio modulation not within the mid/high frequency band (1-100 MHz).

With further reference to FIG. 3, the power and audio signals transmitted by bus 306 are received by the number N speaker units 310. Each speaker unit 308 includes a digital audio transceiver (usually set to receive mode) 307, a power recovery circuit 309 and an output stage 311 to drive the associated speaker. The digital audio receiver decodes the audio signal and transmits the appropriate channel (or object) audio to the output stage for driving the connected speaker 310. The digital audio receiver, may be referred to more generally as a digital audio transceiver in that it may be configured to transmit information back to the control unit 302. In an embodiment, the digital audio transceiver 307 may be configured to transmit status information (e.g., thermals, voltages, currents, impedances, down-angles, etc.) back to the control unit. The transmission protocols (e.g., 1901 and G.hn) and PLC components typically support bi-directional communication in the data-link between the speaker units 308 and the control unit 302. For the bi-directional data-link case, the data transmitter 303 in the control unit 302 is also more generally represented as a transceiver rather than just a transmitter. The components 303 and 307 may each be configured to operate in both or either of transmit/receive modes depending on the data-link configuration and communication direction. Thus, the system may be configured for full-duplex mode (bi-directional communication) or it may be set up for half-duplex operation (uni-directional communication), therefore a switching operation for the transceivers may be a discrete operation (half-duplex case) or it may be an automatic operation (full-duplex case).

One or more sensors may also be provided and associated with the speaker unit to gather status information, such as the operating conditions and characteristics listed above (thermals, voltages, currents, impedances, down-angles, etc.), as well as other relevant characteristics.

The speaker unit 308 may be implemented as a small circuit that is embedded or built into a cabinet enclosing the associated speaker, or it may be implemented as a module or component that is closely coupled to the speaker. In an embodiment, the power recovery circuit of the speaker unit comprises a low impedance speaker driver coupled to a capacitive storage element. The speaker driver allows the speaker unit to provide additional or supplemental power to the incoming audio signal to provide a level of boost or gain. Coupling a capacitive storage element with the low impedance speaker driver allows the speaker unit to capture and store energy from the power source, thus allowing a level of boost or gain in the output voltage as needed. This represents an "energy harvesting" implementation that allows the system to drive the connected loudspeaker to voltage levels that meet or exceed the voltage swings of the inbound power signal.

The digital audio transceiver includes a decode circuit that decodes the channel assignment provided in the multi-channel digital data and modulates the digital data to the associated speaker based on the decoded channel assignment, such that different source content can be played back through each speaker of the N speakers.

Each speaker unit constitutes an "intelligent" piece of electronics at each loudspeaker and the transceiver interface between the control unit and each speaker unit establishes a bi-directional digital communication channel such that each cabinet can digitally report various pieces of telemetry useful for system commissioning, maintenance, and monitoring. Operational parameters include aspects such as down-angle, localization, excursion, etc. Also, as a result of having an on-board power supply and stable power-source to all speakers, loudspeakers can employ I/O devices as needed, such as LEDs, effect lighting, and servo motor control for pan-tilt automation. Loudspeaker telemetry awareness (e.g., down angle, localization, etc.), and performance/fault monitoring per speaker also are possible features. Because the output stages feature local capacitive bulk storage, each channel has an added level of isolation from adjacent channels. This is beneficial in reducing amplifier cross-talk and inter-dynamic interference, and supplements the advantage of having the capacitive bulk storage provide an energy harvesting feature by allowing short-duration moments of higher voltage swings greater than the voltage present within the power source signal.

As described above, embodiments may include a bi-amplification implementation in which small electronic assemblies located at the loudspeakers or speaker units 208 drive two or more speaker components independently (e.g., woofers, midranges or tweeters etc.). In this embodiment, the speaker unit is designed with two output drivers allowing independent audio signal drive to both the woofer and the tweeter, or tweeter and midrange, or any other combination of drivers driven by the speaker unit. The two (or three or more) speakers produce audio in different frequency ranges (e.g., low-woofer and high-tweeter). The derivation of the high-frequency and low-frequency input signals can be performed in the speaker unit (e.g., analog or digital filtering), or the control unit 202 can implement the filters and use two digital audio streams over the power/data bus. In general, there are several advantages to this configuration that may be understood to those of ordinary skill in the art of loudspeaker design, but they are typically implemented using two-channel amplifiers with independent cabling (4 wires 2HF, 2LF), or a powered loudspeaker with internal AC power supply, audio input, and two-channel amplifier. Using the concept of sharing a common power/data bus as described herein allows for a relatively simple implementation for bi-amping speakers.

Figure 5:
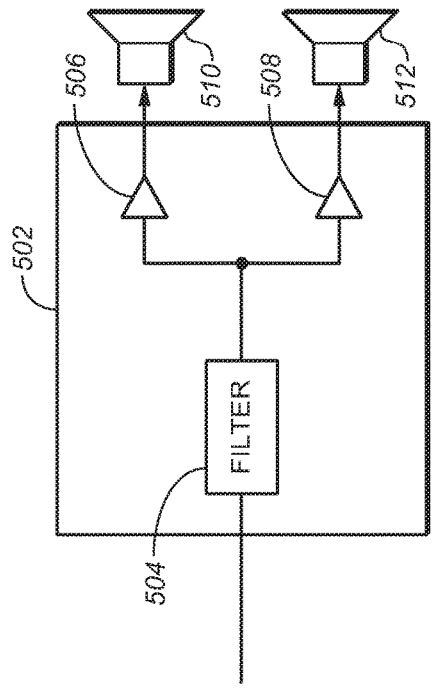
FIG. 5 illustrates a bi-amp embodiment in which a speaker unit drives multiple drivers or speaker elements.

FIG. 5 illustrates an embodiment in which the speaker unit drives two different speakers through a bi-amp configuration. For the embodiment of FIG. 5, speaker unit 502 includes a filter function 504 that derives or produces audio on the appropriate different frequency ranges to drive speakers 510 and 512, which could be embodied as a tweeter/woofer pair, tweeter/midrange pair, or any other appropriate pair (or array) of different speakers. Each speaker may be coupled to its own dedicated driver/amplifier circuit 506/508, or a unitary amplifier may be provided for both speakers. It should be noted that the filter function or component 504 can be included as part of the speaker unit or the control unit, though in FIG. 5 it is shown as being part of the speaker unit. Thus, in an embodiment, the speaker may comprise a multi-driver system having a low frequency driver and a high frequency driver, and the system has a first driver driving the low frequency driver and a second driver driving the high frequency driver, and a filter separating input audio into respective frequency bands transmitted to the low frequency driver and the high frequency driver. The filter may be provided as part of a control unit coupled to the component or it may be closely coupled to the speaker.

In an embodiment, the distributed amplification system is implemented as part of an audio system that is configured to work with a sound format and processing system that may be referred to as a "spatial audio system," "hybrid audio system," or "adaptive audio system." Such a system is based on an audio format and rendering technology to allow enhanced audience immersion, greater artistic control, and system flexibility and scalability. An overall adaptive audio system generally comprises an audio encoding, distribution, and decoding system configured to generate one or more bitstreams containing both conventional channel-based audio elements and audio object coding elements (object-based audio). Such a combined approach provides greater coding efficiency and rendering flexibility compared to either channel-based or object-based approaches taken separately.

Audio objects can be considered groups of sound elements that may be perceived to emanate from a particular physical location or locations in the listening environment. Such objects can be static (i.e., stationary) or dynamic (i.e., moving). Audio objects are controlled by metadata that defines the position of the sound at a given point in time, along with other functions. When objects are played back, they are rendered according to the positional metadata using the speakers that are present, rather than necessarily being output to a predefined physical channel. A track in a session can be an audio object, and standard panning data is analogous to positional metadata. In this way, content placed on a monitor or display used in the audio processing or production system might pan in effectively the same way as with channel-based content, but content placed in the surrounds can be rendered to an individual speaker if desired. In this case, an appropriate graphic user interface (GUI) for rendering the user interface and control information for the audio processing systems to the display is provided as part of the system. While the use of audio objects provides the desired control for discrete effects, other aspects of a soundtrack may work effectively in a channel-based environment. For example, many ambient effects or reverberation actually benefit from being fed to arrays of speakers. Although these could be treated as objects with sufficient width to fill an array, it is beneficial to retain some channel-based functionality.

An example implementation of an adaptive audio system and associated audio format is the Dolby® Atmos® platform. Such a system incorporates a height (up/down) dimension that may be implemented as a 9.1 surround system, or similar surround sound configurations. Such a height-based system may be designated by different nomenclature where height speakers are differentiated from floor speakers through an x.y.z designation where x is the number of floor speakers, y is the number of subwoofers, and z is the number of height speakers. Thus, a 9.1 system may be called a 5.1.4 system comprising a 5.1 system with 4 height speakers.

Figure 6:
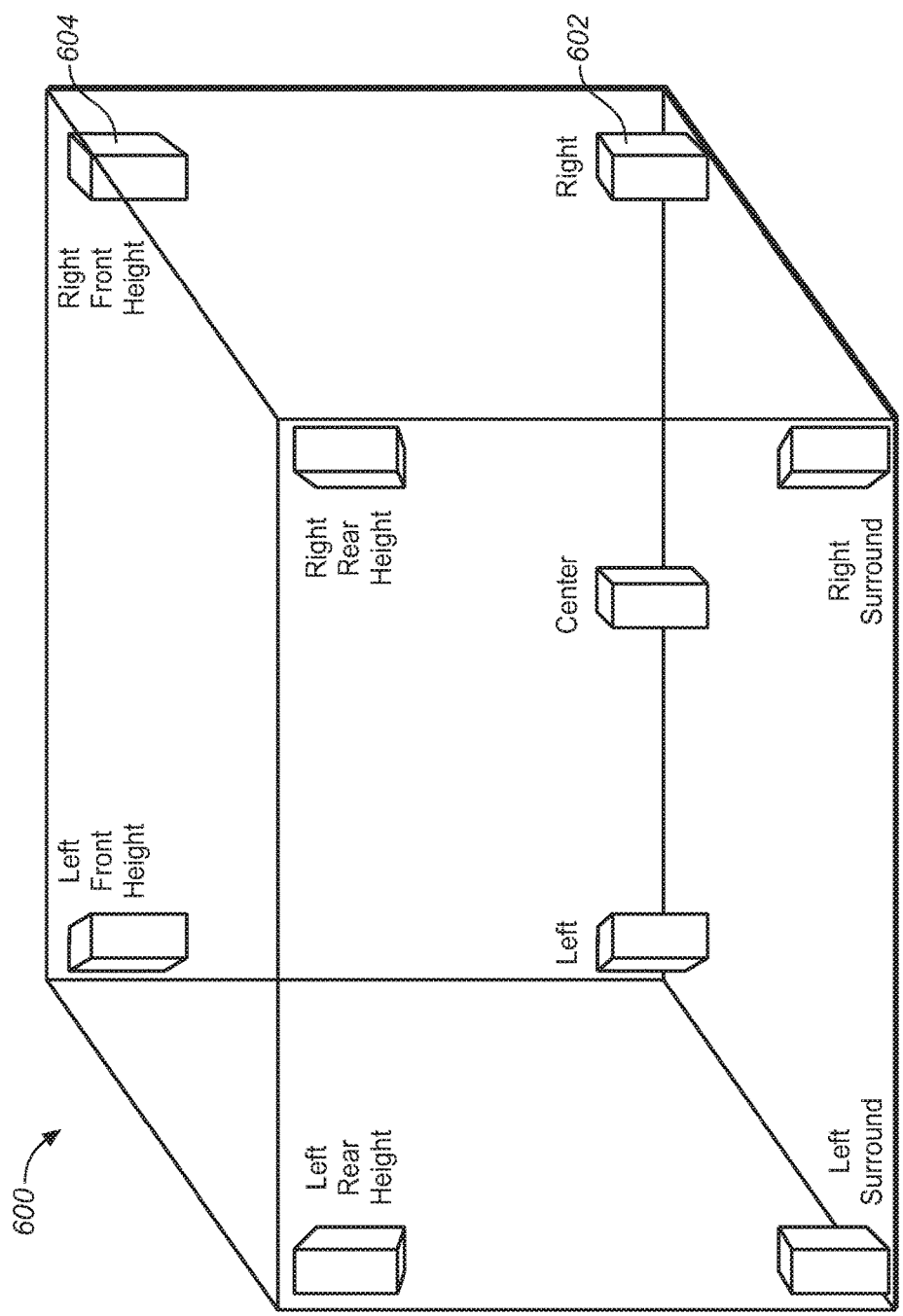
FIG. 6 illustrates an example speaker placement in an adaptive audio surround system (e.g., 9.1 surround) that utilizes a distributed amplification system.

FIG. 6 illustrates the speaker placement in a present surround system (e.g., 5.1.4 surround) that provides height speakers for playback of height channels. The speaker configuration of the system 600 is composed of five speakers 602 in the floor plane and four speakers 604 in the height plane. In general, these speakers may be used to produce sound that is designed to emanate from any position more or less accurately within the room. Predefined speaker configurations, such as those shown in FIG. 6, can naturally limit the ability to accurately represent the position of a given sound source. For example, a sound source cannot be panned further left than the left speaker itself. This applies to every speaker, thereby forming a one-dimensional (e.g., left-right), two-dimensional (e.g., left-right and front-back), or three-dimensional (e.g., left-right, front-back, and up-down) geometric shape, in which the downmix is constrained. Various different speaker arrangements and types may be used in such a speaker configuration. For example, certain enhanced audio systems may use speakers in a 9.1, 11.1, 13.1, 19.4, or other configuration, such as those designated by the x.y.z configuration. The speaker types may include full range direct speakers, speaker arrays, surround speakers, subwoofers, tweeters, and other types of speakers. In an embodiment, each of the speakers has an associated speaker unit that is coupled to a control unit over a two-conductor bus that transmits both power and digital audio, as shown in FIGS. 1-4. The adaptive audio content is mapped in the control unit, such as through the adaptive audio interface, and the IP backbone employed by the system maps the audio to the appropriate speakers.

Aspects of the audio environment described herein represent the playback of the audio or audio/visual content through appropriate speakers and playback devices, and may represent any environment in which a listener is experiencing playback of the captured content, such as a cinema, concert hall, outdoor theater, a home theater or room in a home, conference room, listening booth, car, game console, public address (PA) system, or any other playback environment. Although embodiments have been described primarily with respect to examples and implementations in a commercial theater or home theater environment in which the spatial audio content is associated with movie or television content, it should be noted that embodiments also may be implemented in other consumer-based systems, such as games, screening systems, and any other monitor-based A/V system. The spatial audio content comprising object-based audio and channel-based audio may be used in conjunction with any related content (associated audio, video, graphics, etc.), or it may constitute standalone audio content.

Powered loudspeakers have long been a popular approach within the pro audio segment, but the cost associated with including high-power, AC-DC supplies within every loudspeaker along with pulling line-level audio input signaling to every speaker location can be prohibitive. However, using a distributed power design, multi-box configuration can be paralleled together, driven with a master power sourcing amplifier and each speaker element provided a unique digital audio stream. Another interesting segment is the 70V distributed system, which is employed in a broad variety of applications such as schools, hospitals, airports, malls, office buildings, etc. These systems use step-up and step-down transformers for managing the net load and a power tap as needed, for each of the loudspeaker locations. Unfortunately these transformers can be expensive, limit the power capability, and do not allow full-band audio fidelity. By using the distributed amplification system, each loudspeaker could be provided with full-band digital audio, higher power delivery, and potentially lower cost.

Applications of the distributed amplification system thus range from professional, home and large-scale distributed audio applications, or virtually any application where it is beneficial to minimize cabling and power supply needs. Embodiments allow the use a standard audio amplifier as the power source and standard two-conductor speaker wire as the bus onto which many separate speakers can be daisy chained into a configuration that can be setup to play different audio content through each speaker. The system sends both power and digital audio stream simultaneously on the line to a small speaker unit associated with each speaker that recovers the power and decodes and routes the appropriate digital signal. Retrofitting present systems is advantageous because theaters and other environments can often use existing wiring and equipment infrastructure (e.g., same audio amplifiers, existing cabling, existing speaker layouts, etc.).

With respect to the foregoing description and following claims, unless the context clearly requires otherwise, the words "comprise," "comprising," and the like are to be construed in an inclusive sense as opposed to an exclusive or exhaustive sense; that is to say, in a sense of "including, but not limited to." Statements using the singular form of a word should be deemed to include the plural form and vice versa. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

References throughout this specification to "one embodiment", "some embodiments" or "an embodiment" means that a particular feature, structure or characteristic described in connection with the embodiment is included in at least one embodiment of the disclosed system(s) and method(s). Thus, appearances of the phrases "in one embodiment", "in some embodiments" or "in an embodiment" in various places throughout this description may or may not necessarily refer to the same embodiment. Furthermore, the particular features, structures, or characteristics may be combined in any suitable manner as would be apparent to one of ordinary skill in the art.

While one or more implementations have been described by way of example and in terms of the specific embodiments, it is to be understood that one or more implementations are not limited to the disclosed embodiments. To the contrary, use of those terms is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
an audio amplifier configured as a power source providing output power;
a control unit coupled to an input of the audio amplifier and having an audio signal generator generating a modulating input waveform to the audio amplifier using a digital audio signal to provide an alternating current (AC) stimulus to power multiple audio output stages, wherein the modulating input waveform is generated by an adaptive audio interface and processor coupled to an input of the audio signal generator, the adaptive audio interface receiving input audio in a format comprising one of digital audio, hybrid audio, pure channel-based audio and pure object-based audio, and a first digital audio transceiver coupled to the adaptive audio interface and directly outputting multi-channel digital data to an output of the audio amplifier for transmission to and recovery by a respective speaker unit coupled to a speaker of a plurality of speakers;
a unitary transmission bus coupling the output of the audio amplifier to each speaker of the plurality of speakers through the respective speaker unit of the multiple audio output stages, and transmitting the output power and multi-channel digital data from the first digital audio transceiver to the plurality of speakers; and
a respective digital audio transceiver associated with each speaker of a plurality of speakers to transmit an appropriate channel of the multi-channel digital data to the associated speaker, wherein the control unit is configured to compare input and output signals coming from each channel of the multi-channel digital data and provided from the first digital audio transceiver and each respective digital data audio transceiver to detect fault conditions to alerts or fix fault conditions due to distortion or lack of signal through an automated system configuration process.

2. The system of claim 1 wherein input to the first digital audio transceiver comprises multi-channel digital audio, and the first digital audio transceiver is configured to synchronize and condition the power and the multi-channel digital audio to ensure certain timing, amplitude, and phase characteristics of data transmitted over the unitary transmission bus.

3. The system of claim 1 wherein the AC stimulus provided to the audio amplifier comprises an analog audio-band modulation signal to provide the digital audio signal to stimulate the power supply.

4. The system of claim 1 wherein the unitary transmission bus comprises a single multi-conductor cable having two or three conductors of 10 to 20 gauge speaker wire, and wherein a third conductor comprises an earth ground in the case where the multi-conductor cable comprises three conductors.

5. The system of claim 1 wherein each respective digital audio transceiver comprises:
a low impedance speaker driver coupled to a capacitive storage element in the power recovery circuit that allows an associated speaker to be driven to a voltage level exceeding a voltage swing of the output power; and a transceiver circuit configured to operate in transmit or receive mode and configured to decode a channel assignment provided in the multi-channel digital data and modulate the appropriate multi-channel digital data to the associated speaker based on the decoded channel assignment, such that different source content can be played back through each speaker of the plurality of speakers.

6. The system of claim 2 wherein the power is encoded within a power signal audio band of between 0 (DC) to 20 kHz, and the digital audio data is encoded within a digital audio transmission band of between 1 MHz to 100 Mhz.

7. The system of claim 1 wherein the power source and each respective digital audio transceiver are coupled over the unitary transmission bus using a standardized power-line communication interface, comprising at least one of IEEE 1901 or G.hn protocol.

8. The system of claim 1 wherein the multi-channel digital data is transmitted using an Internet Protocol (IP) transmission, and wherein the first digital audio transceiver comprises an IP interface receiving IP-based streaming audio data, and wherein the IP-based streaming audio data comprises at least in part adaptive audio content having channel-based audio and object-based audio.

9. The system of claim 8 wherein at least some of the plurality of speakers comprises a surround-sound audio system playing back audio signals assigned to discrete channels according to a surround-sound format.

10. The system of claim 9 wherein the at least some of the plurality of speakers comprises a multi-driver speaker, and the respective digital audio transceiver associated therewith comprises a bi-amplification circuit that transmits a first portion of the appropriate channel to a first driver and a second portion to a second driver of the multi-driver speaker.

11. The system of claim 1 wherein the unitary transmission bus comprises one of: two-conductor speaker wire or three-conductor AC power cable including an earth ground conductor.

12. The system of claim 1 wherein each respective digital audio transceiver is associated with a respective speaker through one of: a direct close coupling, a built-in circuit, or a transmission link.

13. The system of claim 2 wherein each respective digital audio transceiver comprises:

a low impedance speaker driver coupled to a capacitive storage element in the power recovery circuit that allows an associated speaker to be driven to a voltage level exceeding a voltage swing of the output power; and a transceiver circuit configured to operate in transmit or receive mode and configured to decode a channel assignment provided in the multi-channel digital data and modulate the appropriate multi-channel digital data to the associated speaker based on the decoded channel assignment, such that different source content can be played back through each speaker of the plurality of speakers.

14. The system of claim 3 wherein each respective digital audio transceiver comprises:

a low impedance speaker driver coupled to a capacitive storage element in the power recovery circuit that allows an associated speaker to be driven to a voltage level exceeding a voltage swing of the output power; and a transceiver circuit configured to operate in transmit or receive mode and configured to decode a channel assignment provided in the multi-channel digital data and modulate the appropriate multi-channel digital data to the associated speaker based on the decoded channel assignment, such that different source content can be played back through each speaker of the plurality of speakers.

15. The system of claim 4 wherein each respective digital audio transceiver comprises:

a low impedance speaker driver coupled to a capacitive storage element in the power recovery circuit that allows an associated speaker to be driven to a voltage level exceeding a voltage swing of the output power; and a transceiver circuit configured to operate in transmit or receive mode and configured to decode a channel assignment provided in the multi-channel digital data and modulate the appropriate multi-channel digital data to the associated speaker based on the decoded channel assignment, such that different source content can be played back through each speaker of the plurality of speakers.

* * * * *